United States Patent
Chen et al.

(10) Patent No.: US 8,661,014 B2
(45) Date of Patent: Feb. 25, 2014

(54) STREAM PROCESSING BY A QUERY ENGINE

(75) Inventors: Qiming Chen, Cupertino, CA (US); Meichun Hsu, Los Altos Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 90 days.

(21) Appl. No.: 12/888,429

(22) Filed: Sep. 23, 2010

(65) Prior Publication Data

US 2012/0078868 A1 Mar. 29, 2012

(51) Int. Cl.
*G06F 17/30* (2006.01)
*G06F 15/16* (2006.01)

(52) U.S. Cl.
USPC .......................................... 707/706; 709/231

(58) Field of Classification Search
USPC ......... 707/615, 648, 670, 682, 684, 685, 702, 707/703, 713, 769, 826, 706; 709/231
See application file for complete search history.

(56) References Cited

U.S. PATENT DOCUMENTS

| | | | |
|---|---|---|---|
| 6,910,032 B2* | 6/2005 | Carlson et al. | 707/769 |
| 7,383,275 B2* | 6/2008 | Chen et al. | 707/743 |
| 7,412,481 B2* | 8/2008 | Nicholls et al. | 709/204 |
| 7,860,884 B2* | 12/2010 | Lee et al. | 707/769 |
| 8,010,512 B2* | 8/2011 | Koyanagi et al. | 707/694 |
| 2007/0005579 A1* | 1/2007 | Grewal et al. | 707/3 |
| 2008/0120283 A1* | 5/2008 | Liu et al. | 707/4 |
| 2009/0106214 A1* | 4/2009 | Jain et al. | 707/4 |
| 2009/0228434 A1* | 9/2009 | Krishnamurthy et al. | 707/2 |
| 2010/0088274 A1* | 4/2010 | Ahmed et al. | 707/610 |
| 2010/0318495 A1* | 12/2010 | Yan et al. | 707/618 |
| 2011/0060890 A1* | 3/2011 | Tanaka et al. | 712/201 |
| 2011/0196856 A1* | 8/2011 | Chen et al. | 707/713 |
| 2011/0246415 A1* | 10/2011 | Li et al. | 707/602 |

OTHER PUBLICATIONS

SQL Stream, Query the Future. Architecture: 2009 SQL Stream Incorporated.
SQL Stream, Query the Future, Change Data Capture (CDC): 2009 SQL Stream Incorporated.
SQL Stream, Query the Future, Real-Time Data Warehousing: 2009 SQL Stream Incorporated.
Damian Black, Relational Asynchonous Messaging, A New Paradigm for Data Management & Integration: Jan. 2007.
SQL Stream Query the Future, SQL Examples: 2009 SQL Stream Incorporated.
SQL Stream, Query the Future, SQLstream's RAMMS Solutions and Applications: 2009 SQL Stream Incorporated.

* cited by examiner

*Primary Examiner* — Jean M Corrielus
*Assistant Examiner* — Evan Aspinwall

(57) ABSTRACT

A database system executes a method that receives, at a query engine in the database system, a continuous stream of data. The query engine continuously analyzes the continuous stream of data with window functions in a single long-standing query.

11 Claims, 6 Drawing Sheets

300 →

| x | y | cid |
|---|---|---|
| 0.001 | 0.001 | 11 |
| 0.002 | 0.002 | 11 |
| 0.003 | 0.003 | 11 |
| ... | ... | ... |
| 0.016 | 0.016 | 12 |
| 0.017 | 0.017 | 12 |
| 0.018 | 0.018 | 12 |
| ... | ... | ... |
| 0.027 | 0.027 | 13 |
| 0.028 | 0.028 | 13 |
| 0.029 | 0.029 | 13 |
| ... | ... | ... |

| Agg | agg2 |
|---|---|
| (0.01,0.01,0.002,0.002,0.001,0.001,0.004,0.004) | (0.03,0.03,0.006,0.006,0.006,0.006,0.009,0.009) |
| (0.045,0.045,0.0045,0.0045,0.001,0.001,0.009,0.009) | (0.05,0.05,0.01,0.01,0.011,0.011,0.014,0.014) |
| (0.07,0.07,0.014,0.014,0.016,0.016,0.019,0.019) | (0.135,0.135,0.0135,0.0135,0.011,0.011,0.019,0.019) |
| (0.09,0.09,0.018,0.018,0.021,0.021,0.024,0.024) | |
| (0.11,0.11,0.022,0.022,0.026,0.026,0.029,0.029) | (0.225,0.225,0.0225,0.0225,0.021,0.021,0.029,0.029) |
| (0.13,0.13,0.026,0.026,0.031,0.031,0.034,0.034) | |
| (0.15,0.15,0.03,0.03,0.036,0.036,0.039,0.039) | (0.315,0.315,0.0315,0.0315,0.031,0.031,0.039,0.039) |
| (0.17,0.17,0.034,0.034,0.041,0.041,0.044,0.044) | |
| (0.19,0.19,0.038,0.038,0.046,0.046,0.049,0.049) | (0.405,0.405,0.0405,0.0405,0.041,0.041,0.049,0.049) |

FIG. 3C

| x | y | agg | agg2 |
|---|---|---|---|
| 0.001 | 0.001 | | |
| 0.002 | 0.002 | | |
| 0.003 | 0.003 | | |
| 0.004 | 0.004 | | |
| 0.005 | 0.005 | (0.01,0.01,0.002,0.002,0.001,0.001,0.004,0.004) | |
| 0.006 | 0.006 | | |
| 0.007 | 0.007 | | |
| 0.008 | 0.008 | | |
| 0.009 | 0.009 | | |
| 0.01 | 0.01 | (0.03,0.03,0.006,0.006,0.006,0.009,0.009) | (0.045, 0.045, 0.045, 0.045, 0.0001, 0.0009, 0.0009) |
| 0.011 | 0.011 | | |
| 0.012 | 0.012 | | |
| 0.013 | 0.013 | | |
| 0.014 | 0.014 | | |
| 0.015 | 0.015 | (0.05,0.05,0.01,0.01,0.011,0.011,0.014,0.014) | |
| 0.016 | 0.016 | | |
| 0.017 | 0.017 | | |
| 0.018 | 0.018 | | |
| 0.019 | 0.019 | | |
| 0.02 | 0.02 | (0.07,0.07,0.014,0.014,0.016,0.016,0.019,0.019) | (0.135,0.135,0.0135,0.0135,0.011,0.011,0.019,0.019) |
| 0.021 | 0.021 | | |
| 0.022 | 0.022 | | |
| 0.023 | 0.023 | | |
| 0.024 | 0.024 | (0.09,0.09,0.018,0.018,0.021,0.021,0.024,0.024) | |
| 0.025 | 0.025 | | |
| 0.026 | 0.026 | | |
| 0.027 | 0.027 | | |
| ... | ... | | |
| 0.045 | 0.045 | (0.17,0.17,0.034,0.034,0.041,0.041,0.044,0.044) | |
| 0.046 | 0.046 | | |
| 0.047 | 0.047 | | |
| 0.048 | 0.048 | | |
| 0.049 | 0.049 | | |
| 0.05 | 0.05 | (0.19,0.19,0.038,0.038,0.046,0.046,0.049,0.049) | (0.405,0.405,0.0405,0.0405,0.041,0.041,0.049,0.049) |

| x | y | agg5 | agg10 |
|---|---|---|---|
| 0.001 | 0.001 | | |
| 0.002 | 0.002 | | |
| 0.003 | 0.003 | | |
| 0.004 | 0.004 | | |
| 0.005 | 0.005 | (0.015,0.015,0.003,0.003,0.001,0.001,0.005,0.005) | |
| 0.006 | 0.006 | (0.02,0.02,0.004,0.004,0.001,0.001,0.006,0.006) | |
| 0.007 | 0.007 | (0.025,0.025,0.005,0.005,0.002,0.002,0.007,0.007) | |
| 0.008 | 0.008 | (0.03,0.03,0.006,0.006,0.003,0.003,0.008,0.008) | |
| 0.009 | 0.009 | (0.035,0.035,0.007,0.007,0.004,0.004,0.009,0.009) | |
| 0.01 | 0.01 | (0.04,0.04,0.008,0.008,0.005,0.005,0.01,0.01) | (0.055,0.055,0.0055,0.0055,0.001,0.001,0.01,0.01) |
| 0.011 | 0.011 | (0.045,0.045,0.009,0.009,0.006,0.006,0.011,0.011) | (0.065,0.065,0.0065,0.0065,0.001,0.001,0.011,0.011) |
| 0.012 | 0.012 | (0.05,0.05,0.01,0.01,0.007,0.007,0.012,0.012) | (0.075,0.075,0.0075,0.0075,0.002,0.002,0.012,0.012) |
| 0.013 | 0.013 | (0.055,0.055,0.011,0.011,0.008,0.008,0.013,0.013) | (0.085,0.085,0.0085,0.0085,0.003,0.003,0.013,0.013) |
| 0.014 | 0.014 | (0.06,0.06,0.012,0.012,0.009,0.009,0.014,0.014) | (0.095,0.095,0.0095,0.0095,0.004,0.004,0.014,0.014) |
| 0.015 | 0.015 | (0.065,0.065,0.013,0.013,0.01,0.01,0.015,0.015) | (0.105,0.105,0.0105,0.0105,0.005,0.005,0.015,0.015) |
| 0.016 | 0.016 | (0.07,0.07,0.014,0.014,0.011,0.011,0.016,0.016) | (0.115,0.115,0.0115,0.0115,0.006,0.006,0.016,0.016) |
| 0.017 | 0.017 | (0.075,0.075,0.015,0.015,0.012,0.012,0.017,0.017) | (0.125,0.125,0.0125,0.0125,0.007,0.007,0.017,0.017) |
| 0.018 | 0.018 | (0.08,0.08,0.016,0.016,0.013,0.013,0.018,0.018) | (0.135,0.135,0.0135,0.0135,0.008,0.008,0.018,0.018) |
| 0.019 | 0.019 | (0.085,0.085,0.017,0.017,0.014,0.014,0.019,0.019) | (0.145,0.145,0.0145,0.0145,0.009,0.009,0.019,0.019) |
| 0.02 | 0.02 | (0.09,0.09,0.018,0.018,0.015,0.015,0.02,0.02) | (0.155,0.155,0.0155,0.0155,0.01,0.01,0.02,0.02) |
| 0.021 | 0.021 | (0.095,0.095,0.019,0.019,0.016,0.016,0.021,0.021) | (0.165,0.165,0.0165,0.0165,0.011,0.011,0.021,0.021) |
| 0.022 | 0.022 | (0.1,0.1,0.02,0.02,0.017,0.017,0.022,0.022) | (0.175,0.175,0.0175,0.0175,0.012,0.012,0.022,0.022) |
| 0.023 | 0.023 | (0.105,0.105,0.021,0.021,0.018,0.018,0.023,0.023) | (0.185,0.185,0.0185,0.0185,0.013,0.013,0.023,0.023) |
| 0.024 | 0.024 | (0.11,0.11,0.022,0.022,0.019,0.019,0.024,0.024) | (0.195,0.195,0.0195,0.0195,0.014,0.014,0.024,0.024) |
| 0.025 | 0.025 | (0.115,0.115,0.023,0.023,0.02,0.02,0.025,0.025) | (0.205,0.205,0.0205,0.0205,0.015,0.015,0.025,0.025) |
| 0.026 | 0.026 | (0.12,0.12,0.024,0.024,0.021,0.021,0.026,0.026) | (0.215,0.215,0.0215,0.0215,0.016,0.016,0.026,0.026) |
| 0.027 | 0.027 | (0.125,0.125,0.025,0.025,0.022,0.022,0.027,0.027) | (0.225,0.225,0.0225,0.0225,0.017,0.017,0.027,0.027) |
| 0.028 | 0.028 | (0.13,0.13,0.026,0.026,0.023,0.023,0.028,0.028) | (0.235,0.235,0.0235,0.0235,0.018,0.018,0.028,0.028) |
| 0.029 | 0.029 | (0.135,0.135,0.027,0.027,0.024,0.024,0.029,0.029) | (0.245,0.245,0.0245,0.0245,0.019,0.019,0.029,0.029) |
| 0.03 | 0.03 | (0.14,0.14,0.028,0.028,0.025,0.025,0.03,0.03) | (0.255,0.255,0.0255,0.0255,0.02,0.02,0.03,0.03) |
| 0.031 | 0.031 | (0.145,0.145,0.029,0.029,0.026,0.026,0.031,0.031) | (0.265,0.265,0.0265,0.0265,0.021,0.021,0.031,0.031) |

FIG. 3D

| x | y | window_agg | moving_agg |
|---|---|---|---|
| 0.001 | 0.001 | | |
| 0.002 | 0.002 | | |
| 0.003 | 0.003 | | |
| 0.004 | 0.004 | | |
| 0.005 | 0.005 | (0.01,0.01,0.002,0.002,0.001,0.001,0.004,0.004) | |
| 0.006 | 0.006 | | |
| 0.007 | 0.007 | | |
| 0.008 | 0.008 | | |
| 0.009 | 0.009 | | |
| 0.01 | 0.01 | (0.03,0.03,0.006,0.006,0.006,0.009,0.009) | (0.055,0.055,0.0055,0.0055,0.001,0.001,0.01,0.01) |
| 0.011 | 0.011 | (0.065,0.065,0.0065,0.0065,0.001,0.001,0.011,0.011) | |
| 0.012 | 0.012 | (0.075,0.075,0.0075,0.0075,0.002,0.002,0.012,0.012) | |
| 0.013 | 0.013 | (0.085,0.085,0.0085,0.0085,0.003,0.003,0.013,0.013) | |
| 0.014 | 0.014 | (0.095,0.095,0.0095,0.0095,0.004,0.004,0.014,0.014) | |
| 0.015 | 0.015 | (0.05,0.05,0.01,0.01,0.011,0.011,0.014,0.014) | (0.105,0.105,0.0105,0.0105,0.005,0.005,0.015,0.015) |
| 0.016 | 0.016 | (0.115,0.115,0.0115,0.0115,0.006,0.006,0.016,0.016) | |
| 0.017 | 0.017 | (0.125,0.125,0.0125,0.0125,0.007,0.007,0.017,0.017) | |
| 0.018 | 0.018 | (0.135,0.135,0.0135,0.0135,0.008,0.008,0.018,0.018) | |
| 0.019 | 0.019 | (0.145,0.145,0.0145,0.0145,0.009,0.009,0.019,0.019) | |
| 0.02 | 0.02 | (0.07,0.07,0.014,0.014,0.016,0.016,0.019,0.019) | (0.155,0.155,0.0155,0.0155,0.01,0.01,0.02,0.02) |

STREAM PROCESSING BY A QUERY ENGINE

BACKGROUND

The amount of data stored in database (DB) systems has been continuously increasing over the last few decades. Database management systems manage large volumes of data that need to be efficiently accessed and manipulated. Queries to the database are becoming increasingly complex to execute in view of such massive data structures. If queries to the database are not completed in a sufficient amount of time, then acceptable performance is difficult to achieve.

Many applications are based on data being continuously collected and provided to databases. Such databases pose challenges to efficiently process and query data in a timely fashion.

BRIEF DESCRIPTION OF THE DRAWINGS

FIG. 3A shows an example stream query using per-tuple stream processing with static data in accordance with an example implementation.

FIG. 3B shows an example stream query using stream processing with two levels of delta windows functions in accordance with an example implementation.

FIG. 3C shows an example stream query that continues FIG. 3B with only output of delta aggregates in accordance with an example implementation.

FIG. 3D shows an example stream query using stream processing with two levels of sliding windows in accordance with an example implementation.

FIG. 3E shows an example stream query using stream processing with mixed delta window function and sliding window function in accordance with an example implementation.

DETAILED DESCRIPTION

Figure 1:
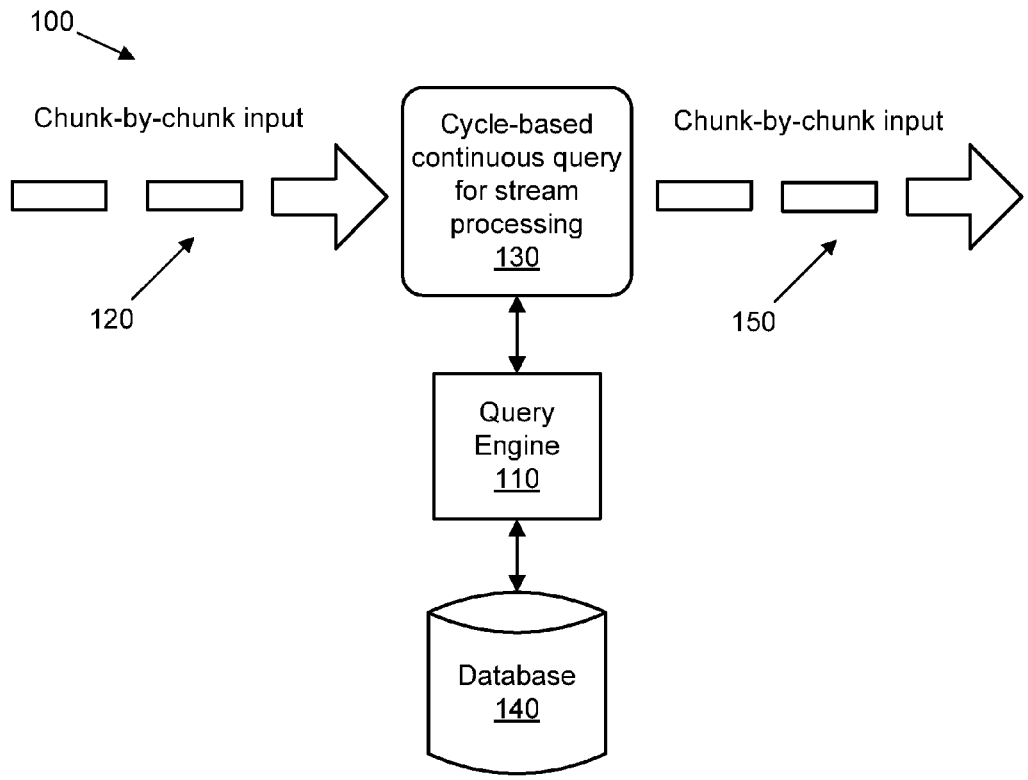
FIG. 1 shows a database system with a query engine in accordance with an example implementation.

Example implementations are systems, methods, and apparatuses that enable window functions for stream processing inside a query engine. The query engine schedules and executes the stream processing with the window functions in a single long-standing query.

In stream processing, businesses collect, transform, and analyze streams of data in real-time and use results of the analysis to make just-in-time business decisions. As explained more fully below, example embodiments push down processing of the streams of data to a management layer where a query engine performs stream processing in order to increase performance and scalability.

Stream processing differs from regular querying processing in several aspects. In the regular query processing, an operation is "concluded" when the "end-of-data" mark is seen. By contrast, the data source is continuous or infinite in stream processing (i.e., a continuous stream of data). Accordingly, in addition to per-record processing, some stream operations are defined on a chunk of data, such as the data in a time window or in a granule boundary (e.g., a number of N records). In order to execute such window operations, the stream processing takes into account the history of states, which is different from regular query operations which take into account the current state without regard to the history of states.

Many stream processing systems are built from scratch outside or separate from the databases and use databases as a sink for storing stream processing results. After the stream processing system is built, it connects to the databases at the client level. Connection at this level causes overhead in data access and transfer and lacks data management capability, such as the management of transaction, recovery, security, etc.

Other stream processing systems build a middleware layer on top of the query engine for handling the window operations in the way of applying a query repeatedly to the incoming data chunks. For processing continuously collected data chunks, these systems continuously and repeatedly utilize a query setup and tear-down. Further, existing Continuous Query (CQ) approaches repeatedly issue the registered query over and over again on collected data chunks (as opposed to an example embodiment that issues only once a single long-standing and/or continuous query). These systems issue millions and millions of one-time queries during the stream processing. Repeatedly issuing the query in this manner causes an overhead of frequent or even infinite query setups and tear-downs.

The CQ approach with example embodiments differs from regular querying in several aspects. Stream data are captured by stream source functions, which are a special kind of User Defined Function (UDF) that is extended with support from the query engine. Further, the CQ does not stop and continuously processes the stream with a single long-standing query, rather than a large number of periodically setup/tear-down short queries.

Existing database systems store the data first and later analyze the data. Due to the massively growing data and pressing need for low latency, example embodiments instead analyze the data in real-time (i.e., on the fly) before the data is stored in the database. As explained more fully below, the query engine continuously analyses the incoming data stream (as opposed to storing the data on a disk, retrieving the data from the disk, and then analyzing the data).

FIG. 1 shows a database system 100 with a database or query engine 110 in accordance with an example implementation. Multiple input streams 120 (shown as chunk-by-chunk input) are input to a cycle-based continuous query for stream processing 130, which is in communication with the query engine 110 and a database 140. The processed input streams are output 150 (shown as chunk-by-chunk output).

Example embodiments utilize the query engine 110 for in-DB stream processing. The query engine processes endless data streams 120 in a record-by-record or tuple-by-tuple fashion. This structure pushes down stream processing to the data management layer, turns the query engine into a streaming engine, and provides stream processing by a single long-standing query, rather than a large number of periodically setup/tear-down short queries (i.e., rather than numerous, single queries issued on the incoming continuous data stream).

Many enterprise applications are based on information or data that is continuously collected. This data is processed as automatic information derivation.

Automatic information derivation is a continuous querying and computation process where an operation is driven by input data streams 120 and outputs to other data streams 150. In this way, the process acts as both a stream consumer and a stream producer. Since input is continuous (i.e., does not end), the process does not cease; although it may have different paces at different operations.

The data-stream-driven processes are specified with Structured Query Language (SQL) queries in which their executions are supported directly at the data management layer (e.g., at the query engine). Pushing down continuous information derivation to the data management layer avoids the round-trip traffic in data access and takes advantage of parallel database technology for performance and scalability.

Figure 2:
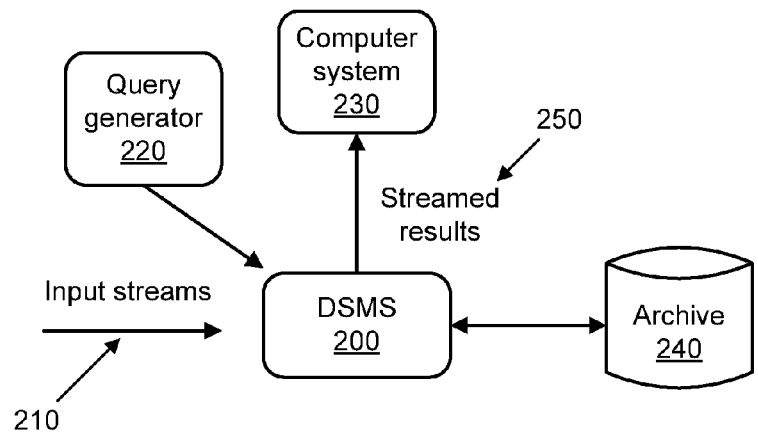
FIG. 2 shows a data stream management system in accordance with an example implementation.

FIG. 2 shows a data stream management system (DSMS) 200 in accordance with an example embodiment. A continuous input stream 210 is provided to the DSMS 200 (which includes the query engine of FIG. 1), which is in communication with a continuous query generator 220, computer system 230, and archive 240. Streamed results 250 are provided to the computer system 230.

In one embodiment, the input stream is an unbounded bag of tuple and timestamp pairs. Windowing operators convert the input streams into relations that are then transformed back into an output or answer stream.

Example embodiments build window functions or operators for query engine enabled stream processing. The window operator is history-sensitive in the sense that it has the capability of keeping the data state in a window of time (e.g. 1 minute) or granule (e.g. 100 tuples), and executing the required operation, such as delta-aggregate, to those data. Window operations are handled by a long-standing forever query, rather than by separate individual short queries. Window operations are directly scheduled by the query engine rather than by an external scheduler or database program (e.g. a PL/SQL script or a stored procedure).

Various window operations with different granularities and for different applications can be specified in a single query and these windows are allowed to be overlapping. Example embodiments support at least two kinds of window operations. These window operations include delta window operations on the data apart of given time or cardinality ranges (e.g. every 1 minute or every 100 tuples) and sliding windows. Further, static data retrieved from the database is cached in a window operation. In one example embodiment, this static data is loaded only once in the entire long-standing query, which removes much of the data access cost of the multi-query based stream processing.

The functions of the query engine are extended by providing a mechanism for interacting a query executor and the window function and for caching window based data state. Example embodiments also integrate window operations in a long-standing query by expressing multilevel, multidimensional window operations in a single query. These features enable example embodiments to support flexible window functions in stream processing in multiple dimensions and along multiple levels, to execute data-intensive stream processing (which uses pre-stored data and knowledge), to use the query engine for complex stream processing. By way of example, one embodiment is a multilevel multidimensional ETL (Extracting, Transforming and Loading) mechanism that uses real-time stream processing directly by the query engine.

With example embodiments, the query engine directly executes database stream processing. In this system, stream processing is specified by a single long-standing query. One or more stream source functions (i.e. a special kind of table function with per-tuple output) are provided in a FROM list of the query and are supported by the query engine. Stream data, such as events, are captured, pre-processed, and delivered by the stream source functions. A window function is specified as scalar user defined functions (UDFs) that appear in the SELECT list of a query or sub-query. Multiple delta and sliding window functions can appear in the same query. The delta and sliding window functions appearing in the same query can have separate or overlapping window boundaries. A window function can emit its results to an external event engine with the event notification/subscription functionality.

FIGS. 3A-3E provide examples of stream queries. For illustration, the source stream elements are tuples representing points with a schema [pid, x, y].

FIG. 3A shows an example stream query 300 using per-tuple stream processing with static data in accordance with an example implementation. The static data are loaded only once prior to the processing of the first tuple. Here the stream data are points and the static data are some center points with the schema of [cid, x, y]; the function assign_center ( ) assigns the cid of the nearest center to each point expressed by its x, y coordinates. The stream source function STREAM_producer (0) delivers infinite number of stream elements (point tuples).

```
SELECT p.x AS x, p.y AS y,
    assign_center (p.x, p.y, 'SELECT * FROM centers') AS cid
FROM STREAM_producer(0) p.
```

FIG. 3B shows an example stream query 310 using stream processing with two levels of delta windows functions in accordance with an example implementation. This query generates the delta aggregates in the form of feature vectors with schema [sum(x), sum(y), avg(x), avg(y), min(x), min(y), max(x), max(y)] for every 5 tuple (agg) and every 10 tuples (agg2) respectively.

```
SELECT p.x AS X, p.y AS y,
    window_agg(p.x, p.y, 5) AS agg,
    window_agg(p.x, p.y, 10) AS agg2
FROM STREAM_producer(0) p.
```

FIG. 3C shows an example stream query 320 that continues FIG. 3B with only output of delta aggregates in accordance with an example implementation.

```
SELECT agg, agg2 FROM (
SELECT p.x, p.y,
    window_agg(p.x, p.y, 5) AS agg,
    window_agg(p.x, p.y, 10) AS agg2
FROM STREAM_producer(0) p) pp
WHERE (agg IS NOT NULL) OR (agg2 IS NOT NULL).
```

FIG. 3D shows an example stream query 330 using stream processing with two levels of sliding windows in accordance with an example implementation. The function moving_agg (p.x, p.y, 5) generates the delta aggregate feature vector for every consecutive 5 tuples, and the function moving_agg(p.x, p.y, 10) generates the delta aggregate feature vector for every consecutive 10 tuples.

```
SELECT p.x AS x, p.y AS y,
    moving_agg(p.x, p.y, 5) AS agg5,
    moving_agg(p.x, p.y, 10) AS agg10
FROM STREAM_producer(0) p.
```

FIG. 3E shows an example stream query 340 using stream processing with mixed delta window function and sliding window function in accordance with an example implementation.

```
SELECT p.x AS x, p.y AS y,
    window_agg(p.x, p.y, 5) AS window_agg,
    moving_agg(p.x, p.y, 10) AS moving_agg
FROM STREAM_producer(0) p.
```

Example embodiments enable multilevel and multidimensional window functions. The multilevel delta aggregation of stream data, plus the analysis functions on the stream data and their delta aggregates in multiple dimensions, is illustrated by the following stream queries, where stream_function t is the stream source, and AE abbreviates "Analysis Engine", a UDF for carrying out analysis task.

In the following [ML/MD Stream Query 1], both aggregate 1 and aggregate 2 are generated from the original stream elements, where w1 and w2 are the window boundary parameters.

```
[ML/MD Stream Query1]
SELECT agg1.*, agg2.*,
    AE-a1(agg1.*), AE-b1(agg1.*), AE-c1(agg1.*),
    AE-a2(agg2.*), AE-b2(agg2.*), AE-c2(agg2.*)
FROM (
SELECT t.*,
    AE-a(t.*), AE-b(t.*), AE-c(t.*),
    aggregate1(t.*, w1) AS agg1, aggregate2(t.*, w2) AS agg2
FROM stream_function t) q1.
```

In the following [ML/MD Stream Query 2], aggregate 1 is generated from the original stream elements, but aggregate 2 is further generated from the resulting aggregates.

```
[ML/MD Stream Query 2]
SELECT Q2.agg2.*,
    AE-a2(Q2.agg2.*),
    AE-b2(Q2.agg2.*),
    AE-c2(Q2.agg2.*)
FROM (
SELECT Q1.agg1.*,
    aggregate2(Q1.agg1.*, w2) AS agg2,
    AE-a1(Q1.agg1.*),
    AE-b1(Q1.agg1.*),
    AE-c1(Q1.agg1.*)
FROM (
SELECT t.*,
    AE-a(t.*), AE-b(t.*), AE-c(t.*),
    aggregate1(t.*, w1) AS agg1
FROM stream_function t) Q1
) Q2.
```

Discussion now turns to window function execution. Like a scalar function in a query, a window function in a stream query is called multiple times, once for each input stream element. In the first call, prior to processing the first input tuple, the desired data structure with the corresponding memory is allocated for caching the state of the function in each window boundary, such as every 100 input tuples, the partial aggregates of the selected attributes of them, or any designated analysis results on them. The data about the window boundary, such as the number of N tuples, the time delta, etc, are set in the first call. Any required static data, such as the centers data shown in example 1, are loaded. The above initiation step takes place once per query. As we are dealing with a long-standing stream processing query, such an initiation actually takes place "once and forever", and is carried-on across multiple calls.

In each normal call, the input data are processed as required, but with NULL output within a window boundary and with ACTUAL output at the end of each window boundary.

One example embodiment simplifies the function developers' efforts in cleanup stuff in the final call by having those efforts left to the query engine.

A discussion now turns to window function development. A window function is a User Defined Function (UDF), but is coded with a Server Programming Interface (SPI) as its interaction with the query engine.

A window function is registered with its signature (i.e. the input and output data types) and optionally its function type (window function) for the query engine to recognize. The parameter for specifying the window boundary is a dynamic parameter that is interpreted and used in the function, or optionally registered for the query engine to recognize.

The memory used in multiple calls is statically allocated in the initiation phase (i.e. in the first call). In the subsequent calls, the content of the data structured allocated in the memory can be altered, but the memory layout remains unchanged.

By the end of the query, the query engine reclaims the memory as a whole, provided that the function is a scalar function.

In each call, the function returns a value, either an actual value or a null result. When the return data type is a tuple with a relation schema and the function is to return a null result, an empty tuple is formed and returned to the query engine.

With the above arrangement, when the function is a scalar function as shown above, the query engine performs the cleanup operation.

A discussion now turns to the query engine. For supporting stream source functions, the query engine delivers function scan results in tuple-wise in order to generate a mechanism of handling end-of data, altered, etc.

For support window functions in stream processing, functions of the query engine are extended. However, as mentioned above, the window functions are developed using SPI, these extensions can also be coded on the window function side.

One example of an extended function for the query engine is the function call handle. The function call handle is the data structure for keeping the static and dynamic information on the function property and calling status, by adding the extra pointers to the memory to be allocated in the initialization of the function call. When this handle is passed to each invocation of the function, the handle is manipulated by both the query engine and the called function and becomes the interface between them.

A second example of an extended function for the query engine is to relax the checking criteria for the function return type (i.e., accept NULL return), rather than to strictly empty the tuple from the window function being called. Correspondingly, the empty tuple generation facility is added based on the registered return type specification for building empty tuples to deliver to upper side of the query processing.

A third example of an extended function for the query engine is to provide a window tuple-store for caching the input tuples falling into a window boundary. With this facility, a window function can defer the data processing to the end of each window boundary, provided it is more efficient or convenient than having data processed incrementally along each call.

Example embodiments enable flexible window functions for stream processing inside the query or database engine. This structure leverages the capability of query engine for scheduling and executing stream processing with window functions built in a single long-standing query. This structure also supports window functions in multiple dimensions and along multiple levels and can execute data-intensive stream processing, which requires pre-stored data and knowledge. Example embodiments avoid the frequent query setup/teardown overhead found in existing query based stream processing.

Figure 4:
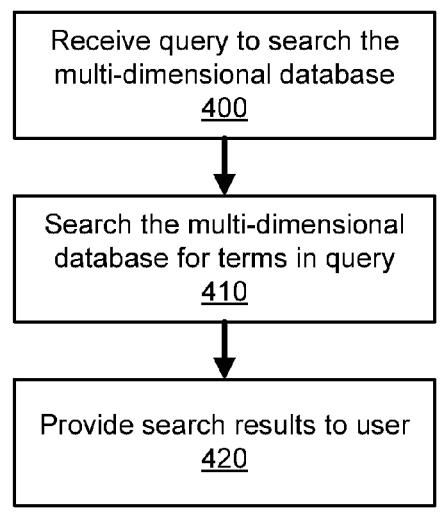
FIG. 4 shows a method in accordance with an example implementation.

FIG. 4 is a flow diagram for traversing a multidimensional database while searching a query in accordance with an exemplary embodiment. By way of example, the flow diagram is implemented in a data center that receives stores data in a database, receives queries from a user, and executes the queries, provides search or query results back to the user.

According to block 400, a query is received to search a multi-dimensional database.

According to block 410, the database is searched for the terms or keywords in the query.

According to block 420, results of the query are provided to the user. For example, the results of the query are displayed to the user on a display, stored in a computer, or provided to another software application.

Figure 5:
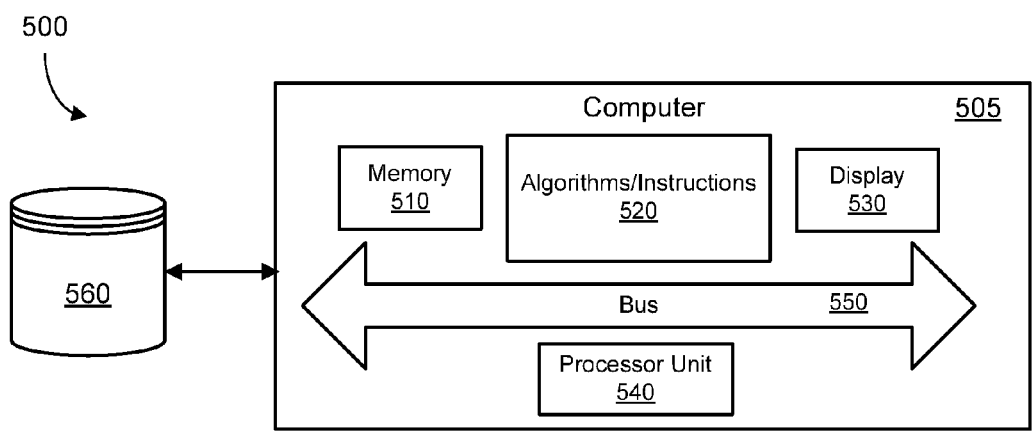
FIG. 5 shows a computer system in accordance with an example implementation.

FIG. 5 is a block diagram of a computer system 500 in accordance with an exemplary embodiment of the present invention. By way of example, the computer system is implemented in a data center.

In one embodiment, the computer system includes a database or warehouse 560 (such as a multidimensional database) and a computer or electronic device 505 that includes memory 510, algorithms and/or computer instructions 520, display 530, processing unit 540, and one or more buses 550.

In one embodiment, the processor unit includes a processor (such as a central processing unit, CPU, microprocessor, application-specific integrated circuit (ASIC), etc.) for controlling the overall operation of memory 510 (such as random access memory (RAM) for temporary data storage, read only memory (ROM) for permanent data storage, and firmware). The processing unit 540 communicates with memory 510 and algorithms 520 via one or more buses 550 and performs operations and tasks necessary for constructing models and searching the database per a query. The memory 510, for example, stores applications, data, programs, algorithms (including software to implement or assist in implementing embodiments in accordance with the present invention) and other data.

As used herein and in the claims, the following words are defined as follows:

The term "continuous query" is a registered query that is continuously and/or repeatedly triggered.

The term "database" means records or data stored in a computer system such that a computer program or person using a query language can send and/or retrieve records and data from the database.

The term "database management system" or "DBMS" is computer software designed to manage databases.

The term "data stream management system" or "DSMS" is computer software that controls the maintenance and querying of data streams. The DSMS issues continuous queries against the data stream, as opposed to a conventional database query that executes once and returns a set of results for the query. The continuous query continues to execute over time, even as new data enters the data stream.

The term "extract, transform, load" or "(ETL)" in a database or data warehouse extracting data from a source, transforming the data for operational requirements, and loading the data into the database or data warehouse.

The term "pushing down processing of the stream to the management layer" means processing the stream at the query engine. In regular or previous database applications, queries are issued from the application and sent to the query engine for execution, with the results of the query being sent back to the application. This process causes overhead in data transfer between the database engine and the application. This process also causes overhead in data access (via ODBC for connecting to DB, parse query, etc). By contrast with example embodiments, the application program is directly executed by the query engine using UDFs (User Defined Functions) with fast data access and reduced data movement.

The term "multidimensional database" is a database wherein data is accessed or stored with more than one attribute (a composite key). Data instances are represented with a vector of values, and a collection of vectors (for example, data tuples) are a set of points in a multidimensional vector space.

The term "Structured Query Language" or "SQL" is a database computer language that retrieves and manages data in a relational database management systems (RDBMS), database schema creation and modification, and database object access control management. SQL provides a language for an administrator or computer to query and modifying data stored in a database.

The term "stream" is a time varying data sequence. For example, a stream can be a continuous sequence of (tuple, timestamp) pairs, where the timestamp defines an order over the tuples in the stream.

The term "query engine" is a component of a database management system that is used to evaluate queries (e.g., SQL queries) to generate responses or answers to the queries.

The term "User Defined Functions" or "UDF" is a function in a program that provides a mechanism for extending the functionality of a database server by adding a function that can be evaluated in SQL statements.

The term "window functions" is a function that is applied to the data falling in the window of value range (e.g., the data between the values of 100-200) and/or the window of time (e.g., is a time window such as every one minute).

In one example embodiment, one or more blocks or steps discussed herein are automated. In other words, apparatus, systems, and methods occur automatically. The terms "automated" or "automatically" (and like variations thereof) mean controlled operation of an apparatus, system, and/or process using computers and/or mechanical/electrical devices without the necessity of human intervention, observation, effort and/or decision.

The methods in accordance with example embodiments are provided as examples and should not be construed to limit other embodiments within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing example embodiments. Such specific information is not provided to limit example embodiments.

In some example embodiments, the methods illustrated herein and data and instructions associated therewith are stored in respective storage devices, which are implemented as one or more computer-readable or computer-usable storage media or mediums. The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

Example embodiments are implemented as a method, system, and/or apparatus. As one example, example embodiments and steps associated therewith are implemented as one or more computer software programs to implement the methods described herein. The software is implemented as one or more modules (also referred to as code subroutines, or "objects" in object-oriented programming). The software programming code, for example, is accessed by a processor or processors of the computer or server from long-term storage media of some type, such as a CD-ROM drive or hard drive. The software programming code is embodied or stored on any of a variety of known physical and tangible media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles of various example embodiments. Numerous variations and modifications will become apparent to those skilled in the art once the above disclosure is fully appreciated. It is intended that the following claims be interpreted to embrace all such variations and modifications.

What is claimed is:

1. A method executed by a computer system, comprising:
    receiving, at a query engine in the computer system, a continuous stream of data;
    pushing down processing of the continuous stream of data to a management layer where the query engine executes an application requesting a query of the continuous stream of data using User Defined Functions (UDFs) and performs stream processing of the continuous stream of data; and
    continuously analyzing, inside the query engine, the continuous stream of data with multilevel, multidimensional window functions in a single long-standing query.

2. The method of claim 1, wherein the query engine continuously analyses the continuous stream of data as opposed to first storing the continuous stream of data on a disk and then analyzing the continuous stream of data.

3. The method of claim 1 further comprising, issuing the single long-standing query only once to continuously analyze the continuous stream of data as opposed to repeatedly issuing a query on the continuous stream of data.

4. The method of claim 1 further comprising, building the multilevel, multidimensional window functions for the query engine to process the continuous stream of data, wherein the multilevel, multidimensional window functions keep a history of a data state in a window of time.

5. A tangible, non-transitory computer readable storage medium storing instructions that, when executed by a query engine in a computer system, cause the query engine to:
    receive, at the query engine, a continuous stream of data;
    issue, inside the query engine, a single long-standing query to process the continuous stream of data;
    process, inside the query engine, the continuous stream of data with multilevel, multidimensional window functions in the single long-standing query; and
    schedule the multilevel, multidimensional window functions to process the continuous stream of data, wherein the multilevel, multidimensional window functions include sliding window operations and delta window operations that operate on data apart of a given time or cardinality range.

6. The tangible, non-transitory computer readable storage medium of claim 5, wherein the query engine analyzes the continuous stream of data in real-time before the continuous stream of data is stored in a database.

7. The tangible, non-transitory computer readable storage medium of claim 5, wherein query engine further executes the instructions to:
    schedule the multilevel, multidimensional window functions to process the continuous stream of data, wherein the multilevel, multidimensional window functions are scheduled directly by the query engine.

8. A computer system, comprising:
    a database; and
    a query engine in communication with the database, wherein the query engine receives a continuous stream of data, schedules multilevel, multidimensional window functions to process the continuous stream of data, and processes the continuous stream of data with the multilevel, multidimensional window functions in a single long-standing query; wherein the multilevel, multidimensional window functions are specified as scalar user defined functions (UDFs) that appear in a list of a query to the database.

9. The computer system of claim 8, wherein a multilevel multidimensional ETL (Extracting, Transforming and Loading) mechanism uses real-time stream processing directly by the query engine.

10. The computer system of claim 8, wherein the multilevel, multidimensional window functions comprise delta functions and sliding window functions, and wherein the query engine processes multiple delta functions and sliding window functions that appear in a same query to the database.

11. The computer system of claim 8, wherein the continuous stream of data has multiple input stream elements, and each of the multilevel, multidimensional window functions is called multiple times, one time for each of the multiple input stream elements.

* * * * *

UNITED STATES PATENT AND TRADEMARK OFFICE
CERTIFICATE OF CORRECTION

PATENT NO. : 8,661,014 B2  
APPLICATION NO. : 12/888429  
DATED : February 25, 2014  
INVENTOR(S) : Qiming Chen et al.

Page 1 of 1

It is certified that error appears in the above-identified patent and that said Letters Patent is hereby corrected as shown below:

In the Claims

In column 10, line 32, in Claim 7, after "wherein" insert -- of --.

Signed and Sealed this
Twenty-sixth Day of May, 2015

Michelle K. Lee
*Director of the United States Patent and Trademark Office*